June 1, 1926.
A. G. McCALEB
LIQUID LEVEL INDICATOR
Filed August 5, 1921
1,587,340
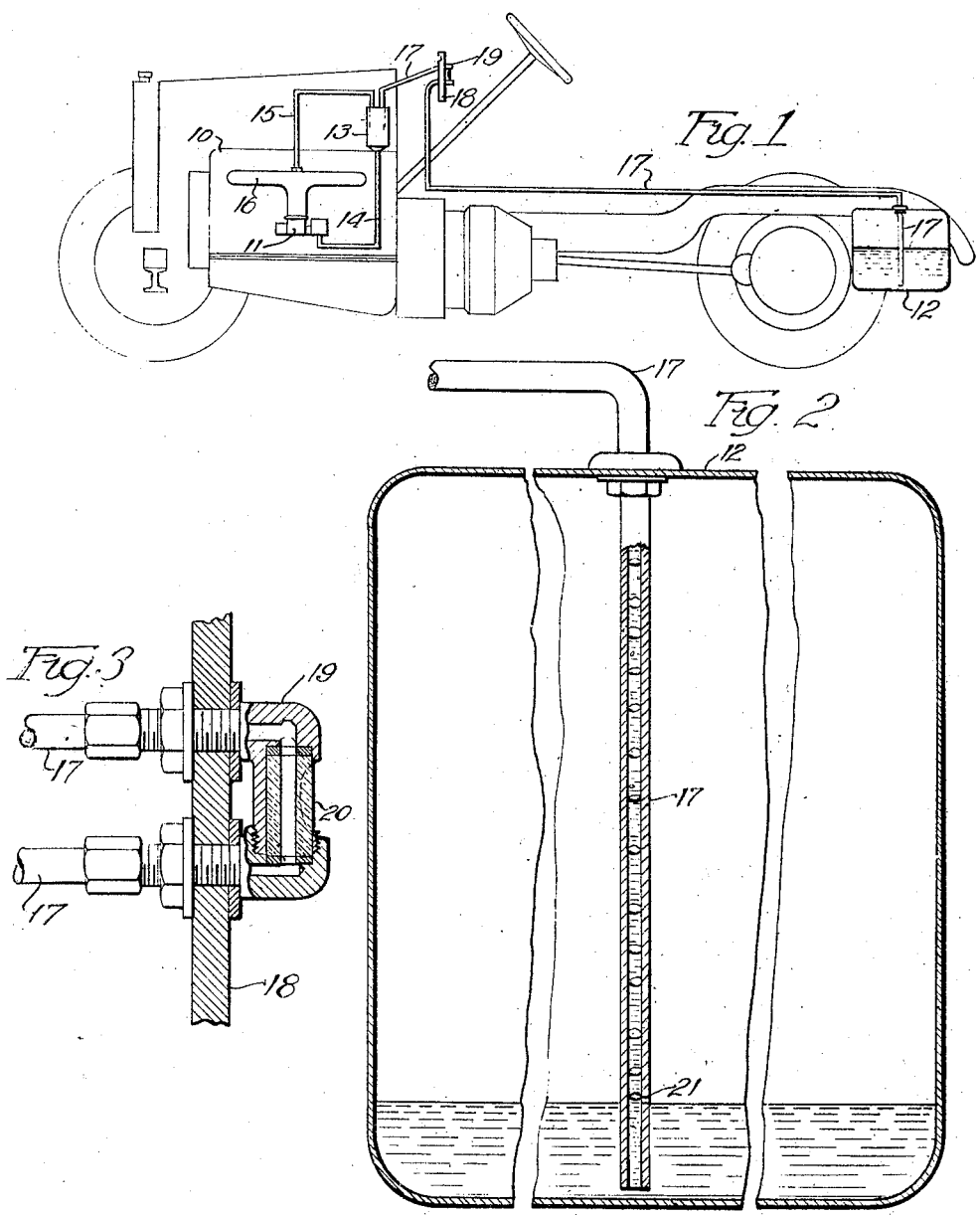

Patented June 1, 1926.

1,587,340

UNITED STATES PATENT OFFICE.

ALBERT G. McCALEB, OF OAK PARK, ILLINOIS.

LIQUID-LEVEL INDICATOR.

Application filed August 5, 1921. Serial No. 490,007.

My invention relates to liquid level indicators, the specific object of the invention being to afford a visual indication to the driver of an automobile when the fuel level in the tank has dropped below a predetermined height, whereby he may be warned in time to replenish the fuel supply before the tank is completely emptied.

Referring to the accompanying drawings, wherein I have illustrated an adaptation of my invention, Figure 1 is a diagrammatic view of an automobile chassis embodying the fuel level indicator of my invention;

Figure 2 is an enlarged fragmentary section of the fuel tank and fuel conduit, and Figure 3 is an enlarged view partly in section of the sight tube which is interposed in the fuel conduit.

The automobile shown comprises an internal combustion engine 10 provided with the usual fuel carburetor 11 supplied from a fuel tank 12 carried at the rear of the chassis and at a level somewhat below that of the carburetor. For lifting fuel from this low level tank to the carburetor, a so-called vacuum tank 13 is employed, such, for instance, as that shown in the Reissue Patent No. 14,353, of September 11, 1917, to Webb Jay. The outer chamber of the vacuum tank 13 discharges through a conduit 14 to the float bowl of the carburetor 11, while a suction conduit 15 communicates from the intake manifold 16 of the engine to the suction port of the vacuum tank. A fuel conduit 17 extends upwardly from a point adjacent the bottom of the fuel tank 12 to the top thereof, and thence forwardly to the fuel inlet port of the vacuum tank 13. It will be noted that the fuel conduit 17 is brought upwardly to the instrument board 18 of the automobile where a sight tube 19 is interposed in the conduit. It is thus apparent that all the fuel which is sucked by the vacuum tank from the fuel tank will pass through the sight tube 19, which comprises a transparent glass section 30 so mounted as to be easily observed by the driver from his driving position.

The vertical portion of the conduit 17 which lies within the fuel tank 12 is provided with a pin-hole aperture 21 a short distance above the lower end of the conduit. The aperture 21 is placed a definite distance above the point of communication between the conduit 17 and the tank 12 at a level, let us say, which represents two gallons of fuel within the tank. So long as there are more than two gallons of fuel in the tank, it is clear that during each suction operation of the vacuum tank, a continuous column of fuel will be drawn through the conduit 17 and consequently through the glass section of the sight tube 19. Under such circumstances, the driver will observe merely a clear column of liquid in the sight tube.

When, however, the fuel level in the tank 12 falls to a height below the aperture 21, the air within the tank above the fuel will be sucked through the aperture 21 along with the column of fuel drawn upwardly through the inlet end of the conduit 17. This air will take the form of bubbles which separate short lengths of fuel. Under these circumstances, the driver will observe the air bubbles in the column as they are drawn through the sight tube, and will thereby be warned that less than two gallons of fuel remains in the tank.

I contemplate that my invention may be used not only with a fuel feed system embodying the so-called vacuum tank, but also may be used with other fuel feed means such as carburetors of the fuel lifting type, similar, for example, to that shown and described in Patent No. 1,370,949, granted March 8, 1921, to Milford G. Chandler. I also contemplate that my invention may be applied to fuel feed systems employing a positive pressure within the fuel tank, rather than a suction on the fuel conduit.

That the efficiency of the fuel supply means or of the engine is not impaired by the introduction of small quantities of air in the fuel conduit, is demonstrated by the success of devices of the nature shown in Patent No. 1,364,479, granted January 4, 1921, to C. C. Bradbury. In this patent the air bubbles are employed for the purpose of lightening the column of lifted fuel, whereas this function is only incidental and not the primary purpose of the air bubbles used in my invention. It is to be observed, however, that the air bubbles are allowed to enter the fuel column and lighten it, at a time when the fuel must be lifted a maximum distance, and that consequently a fuel lifting device of less capacity may be used.

Having thus described my invention, what I claim is:

1. In a vehicle, an engine, a main fuel tank, and a conduit through which the fuel requirements of the engine are supplied by suction, a sight tube interposed in said conduit and located at the driver's position, that part of the conduit which communicates with the tank comprising a portion which projects into the tank and is provided above its lower end with a small air inlet aperture located at a definite point above the bottom of said tank whereby, when said air inlet aperture is uncovered by lowering of the level of fuel in said tank a series of bubbles will be formed in said conduit and will pass through the sight tube to thereby visually indicate the condition of the fuel supply.

2. In a fuel supply system, a fuel tank, a conduit through which the fuel requirements of an engine are supplied from said tank by suction, means for indicating the presence of air bubbles in said conduit, and means for admitting air to said conduit to form bubbles therein when the fuel in said tank falls below a certain level.

In witness whereof, I hereunto subscribe my name this 3rd day of August, 1921.

ALBERT G. McCALEB.